Dec. 2, 1941.                W. F. GROENE                 2,264,752
                         FLAME HARDENING MACHINE
                    Filed Dec. 24, 1940        17 Sheets-Sheet 1
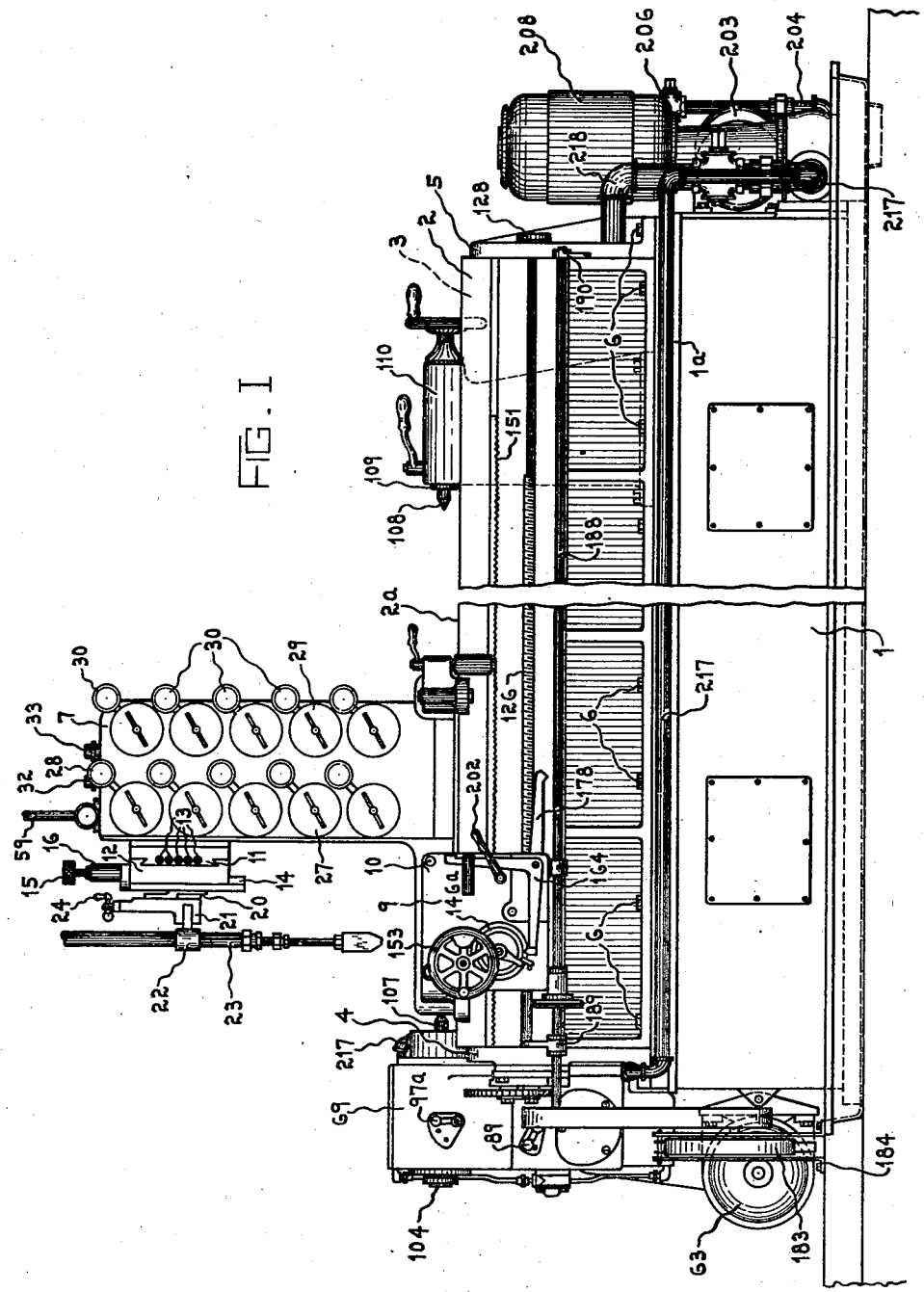
INVENTOR.
WILLIAM F. GROENE
BY Willard S. Groene
ATTORNEY.

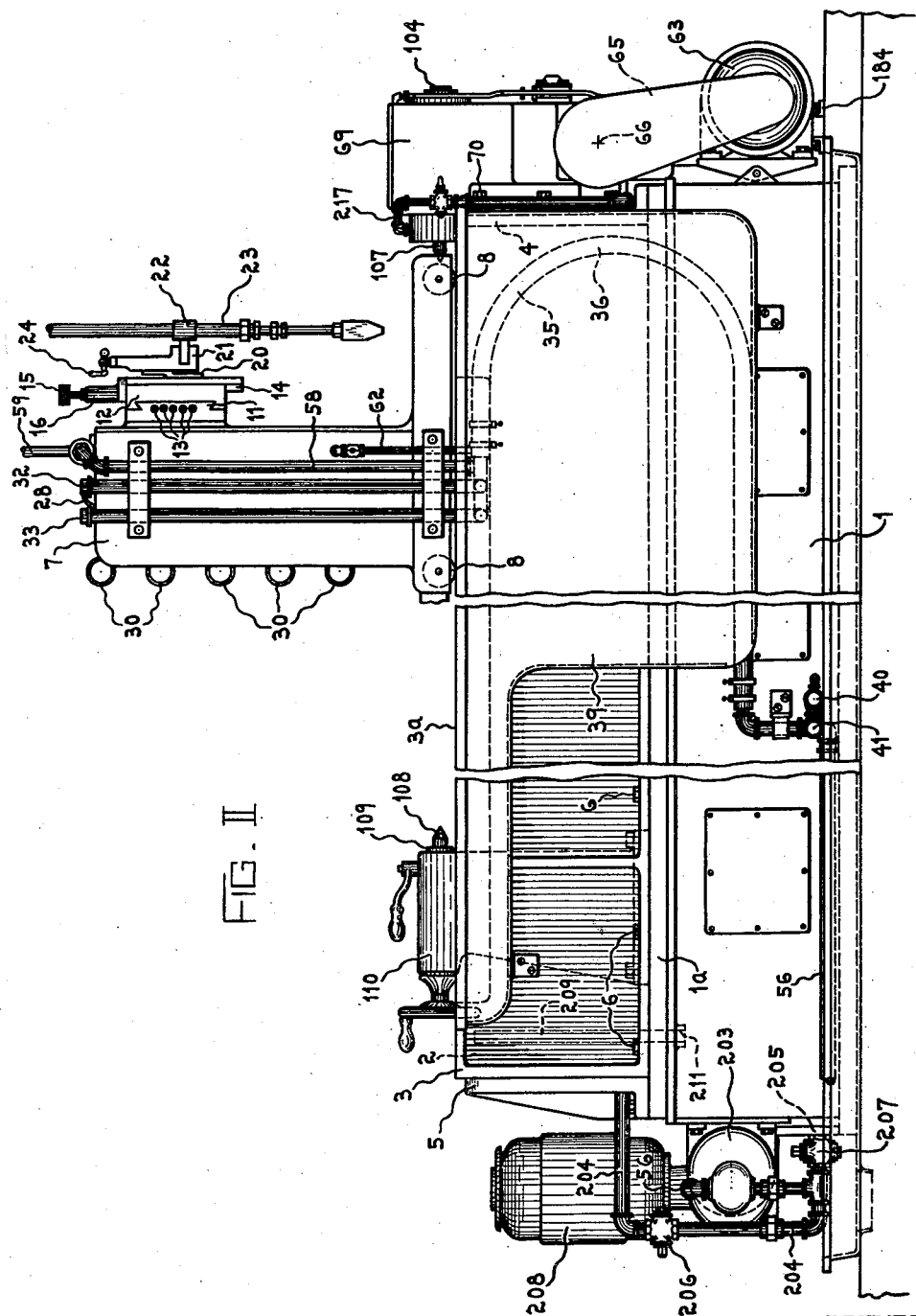

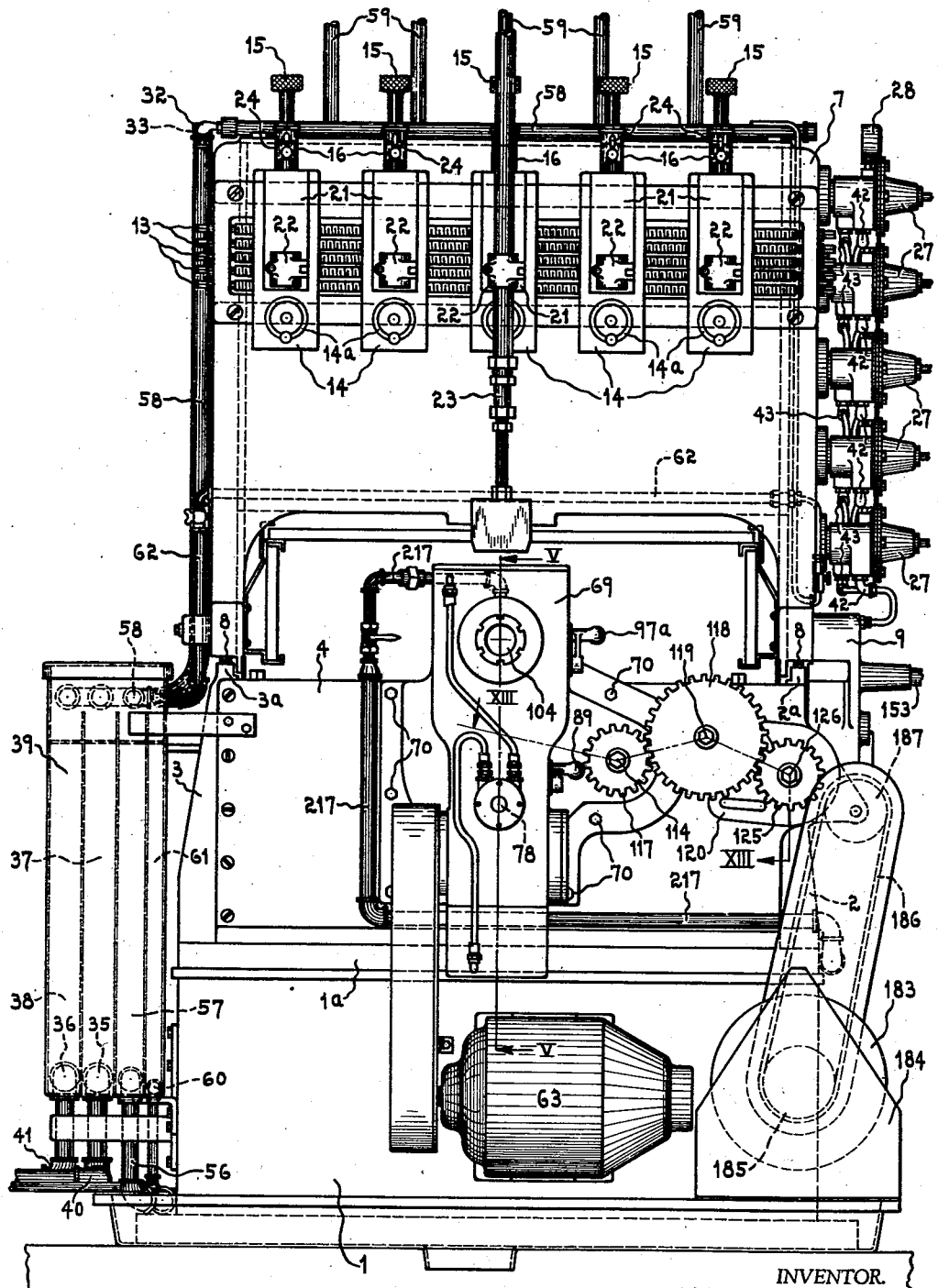
FIG. III
INVENTOR.
WILLIAM F. GROENE

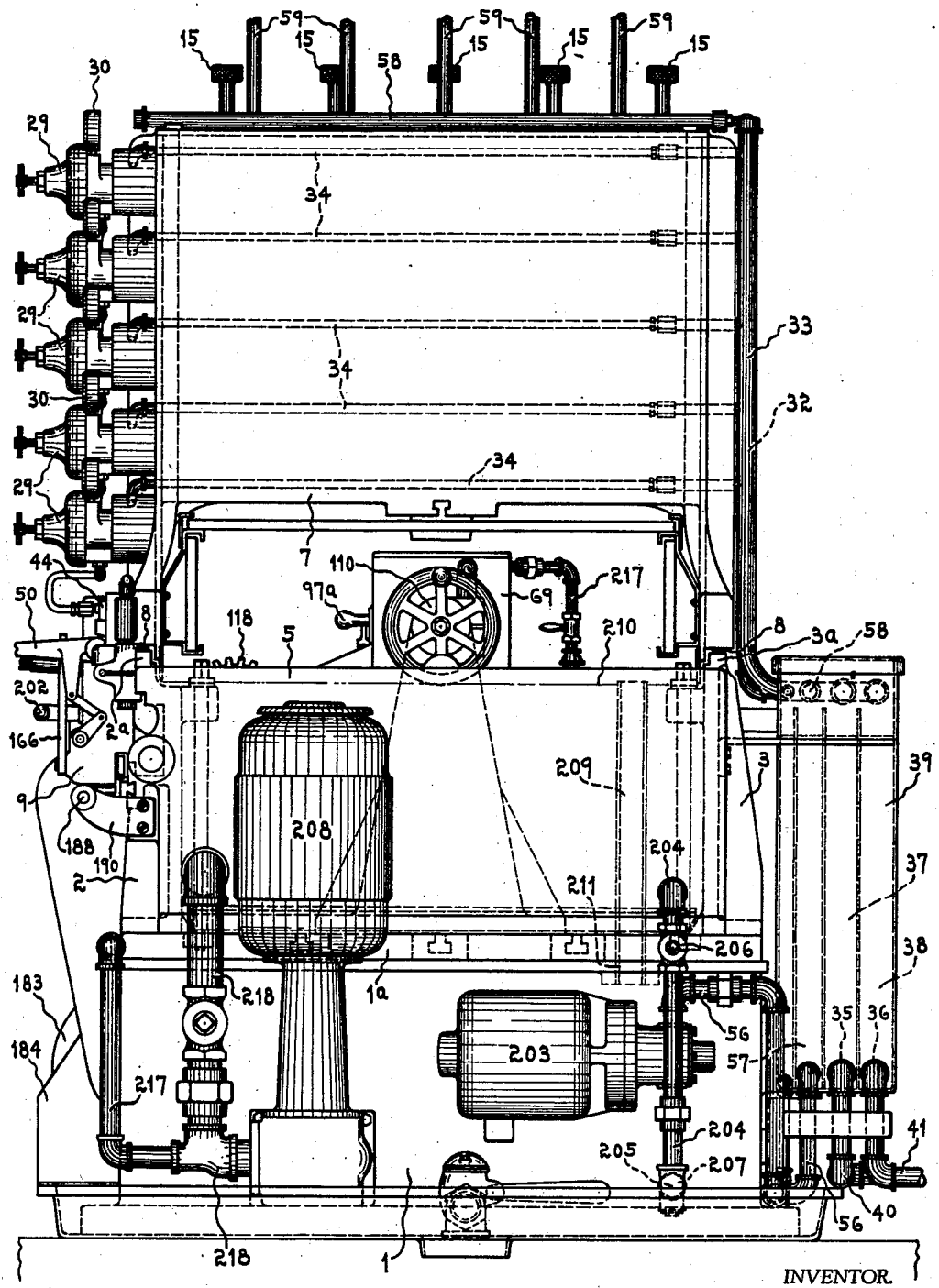

Dec. 2, 1941.  W. F. GROENE  2,264,752
FLAME HARDENING MACHINE
Filed Dec. 24, 1940  17 Sheets-Sheet 5
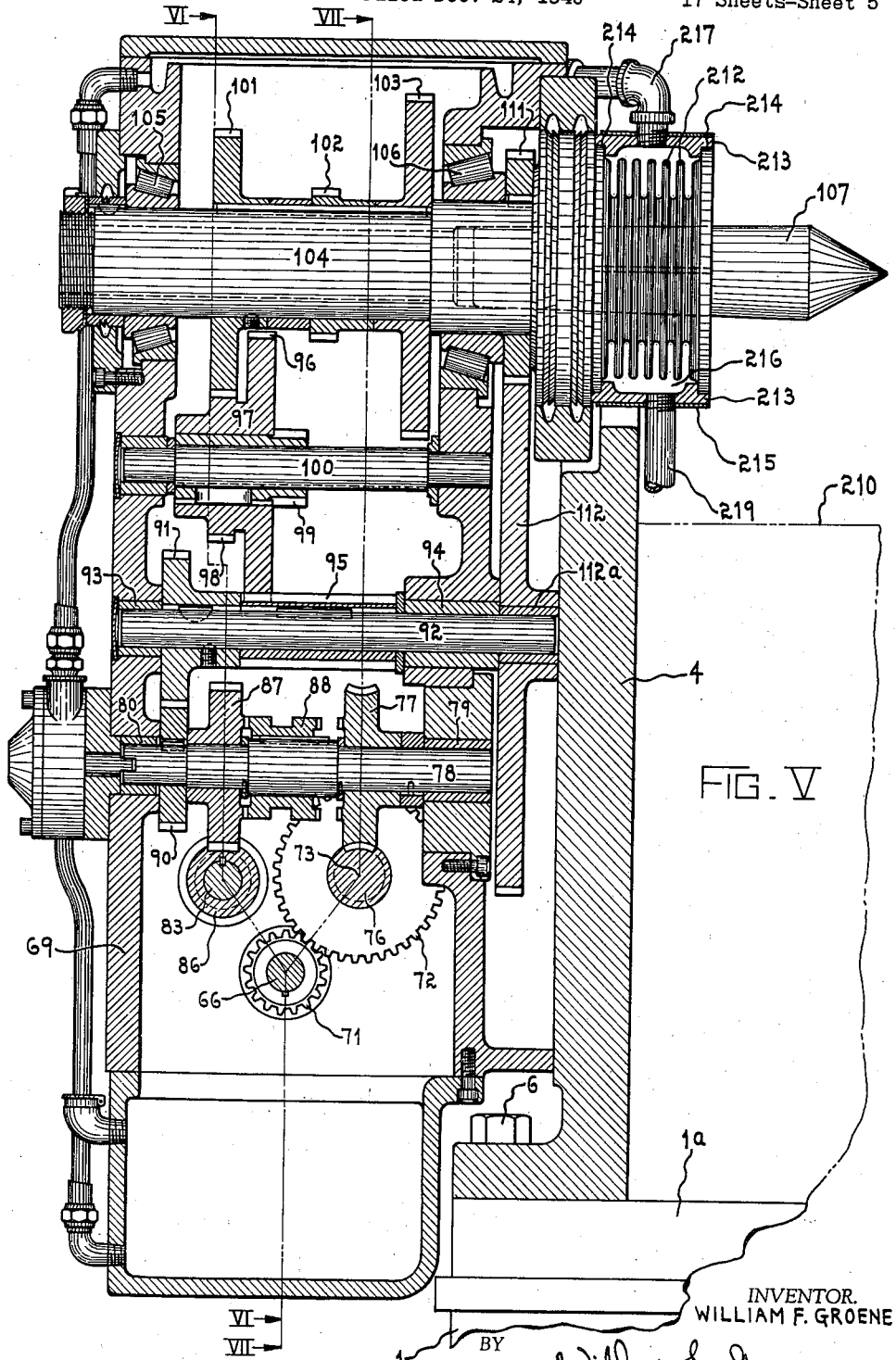
FIG. V
INVENTOR.
WILLIAM F. GROENE
BY Willard L. Groene
ATTORNEY.

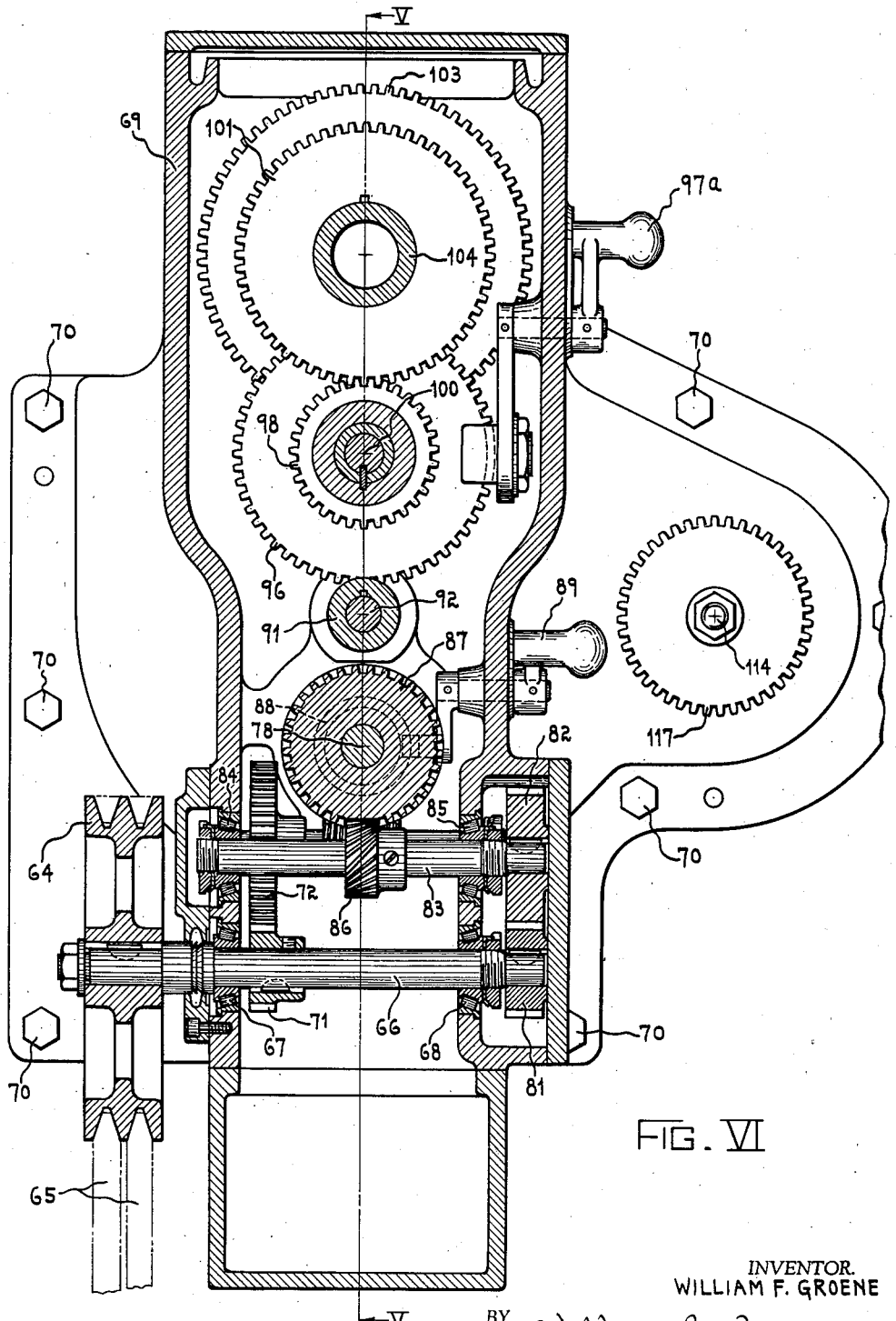
FIG. VI

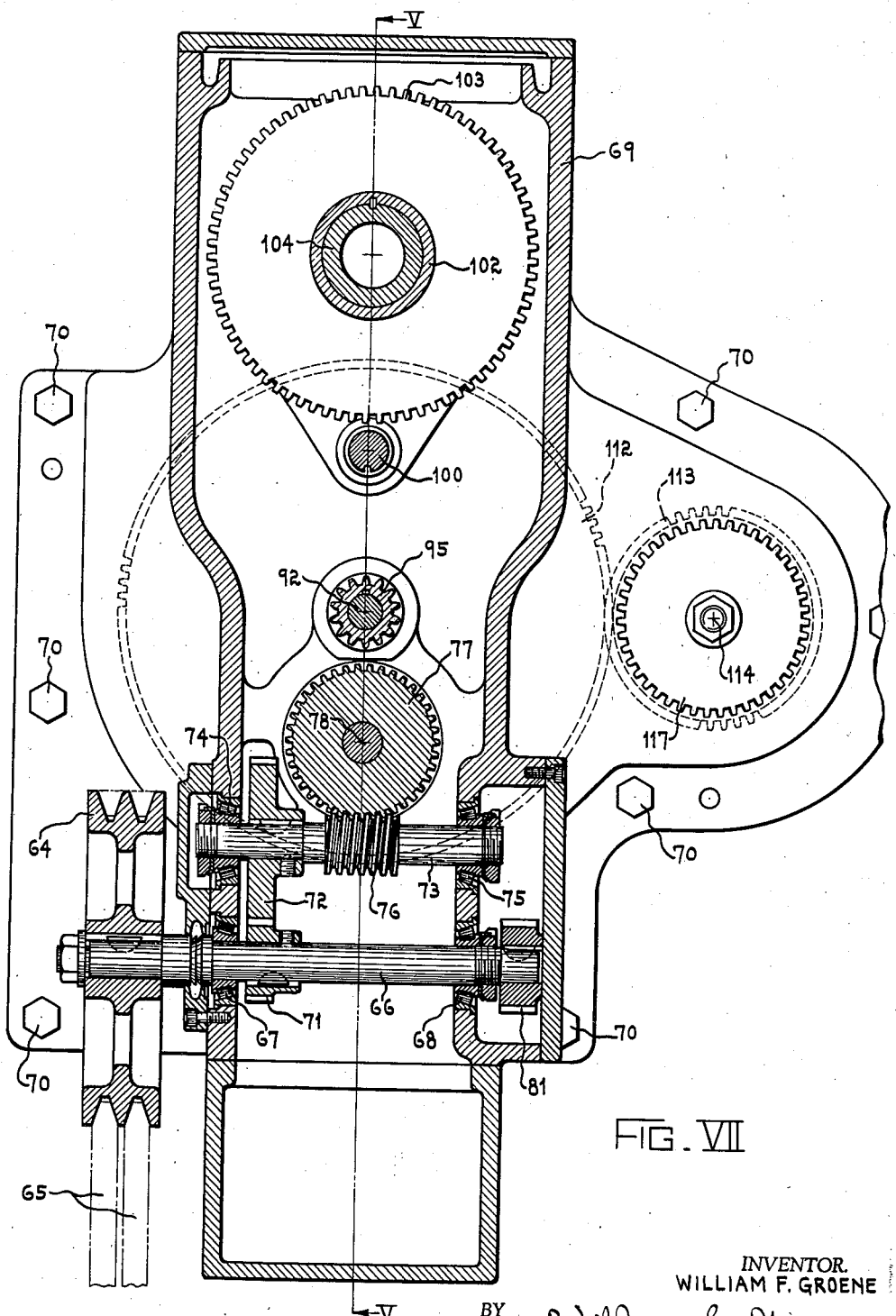

Dec. 2, 1941.   W. F. GROENE   2,264,752
FLAME HARDENING MACHINE
Filed Dec. 24, 1940   17 Sheets-Sheet 8
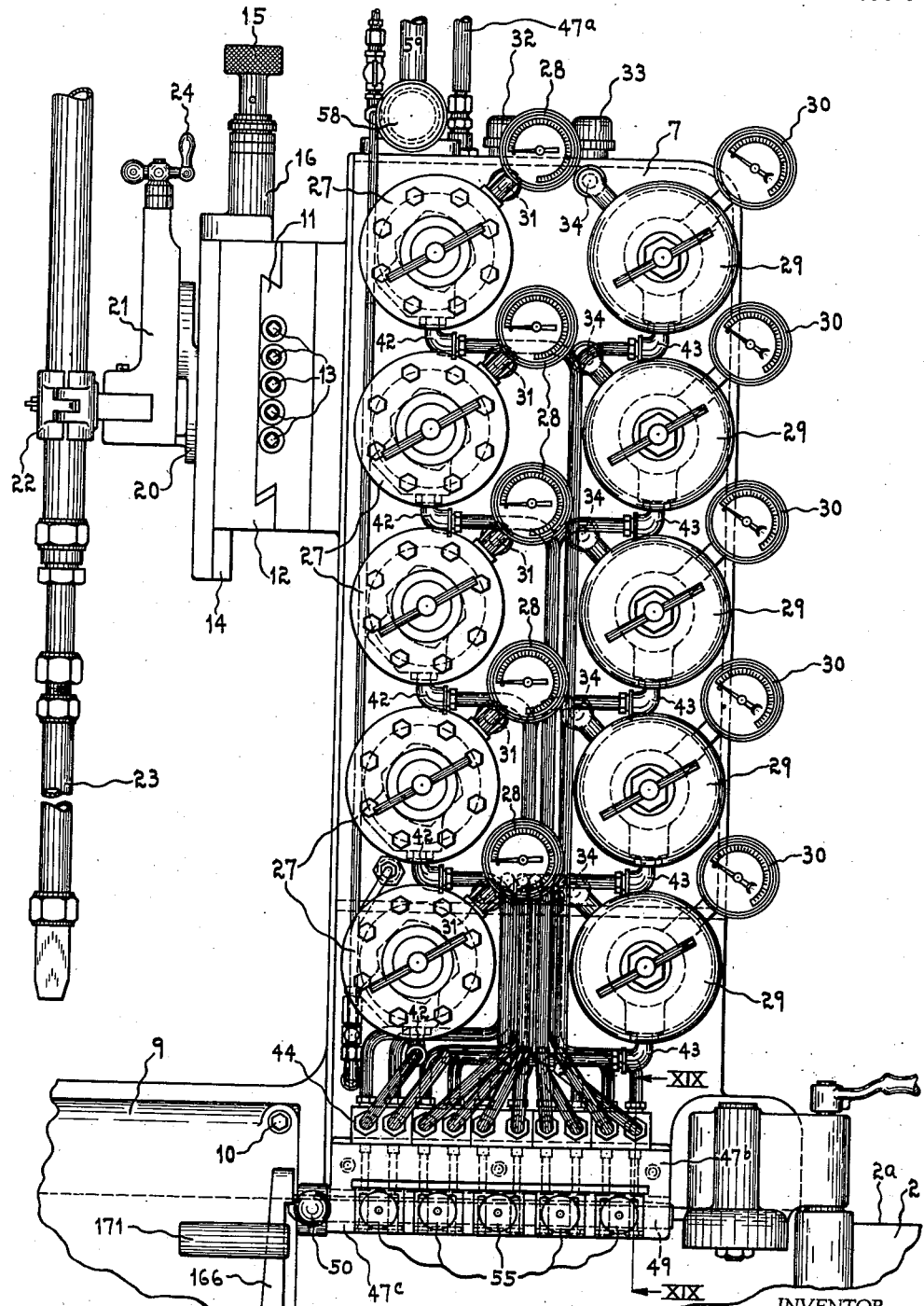
FIG. VIII
INVENTOR.
WILLIAM F. GROENE
BY Willard S. Groene
ATTORNEY.

Dec. 2, 1941.  W. F. GROENE  2,264,752
FLAME HARDENING MACHINE
Filed Dec. 24, 1940   17 Sheets-Sheet 9
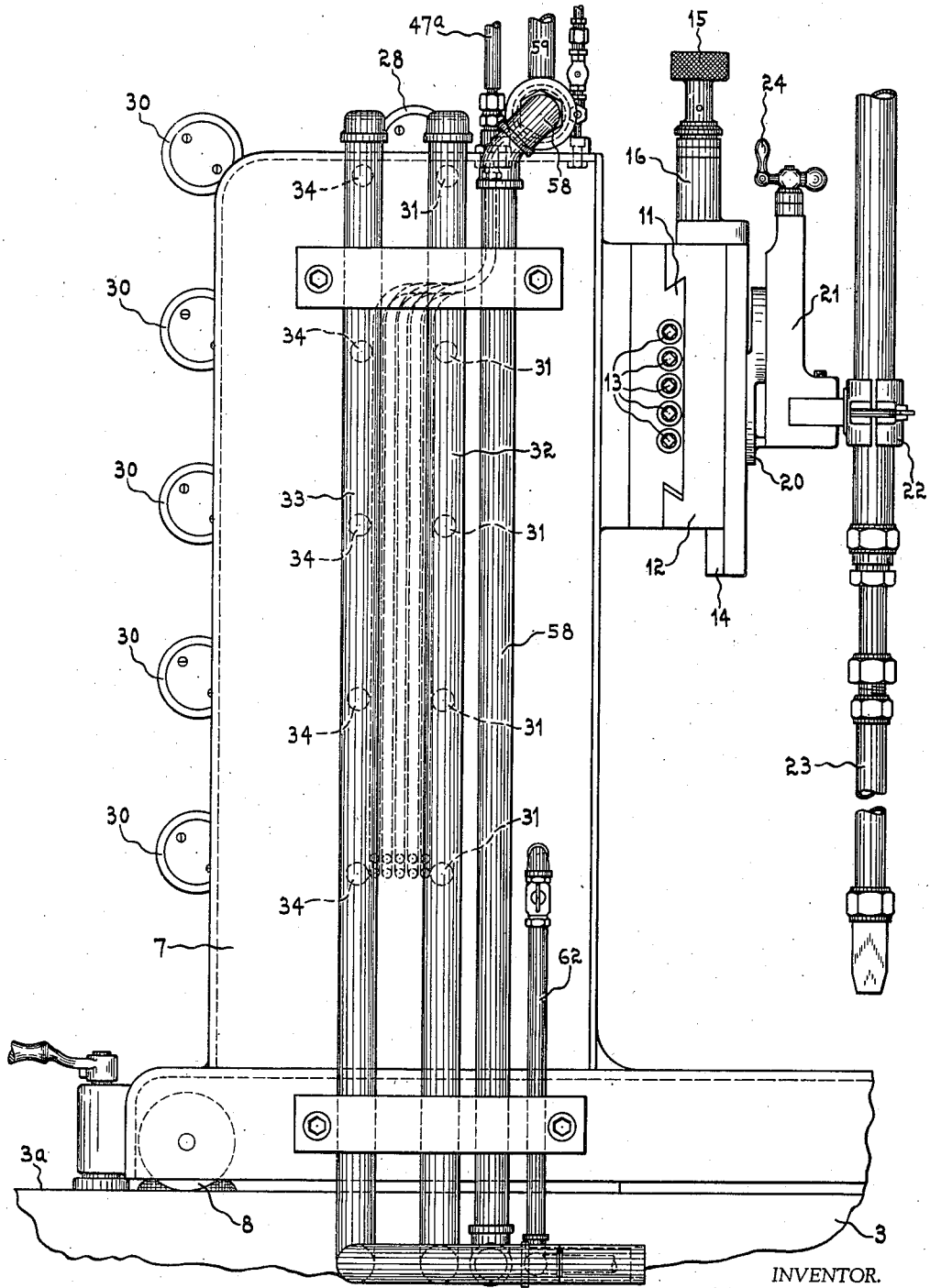
FIG. IX
INVENTOR.
WILLIAM F. GROENE
BY Willard S. Groene
ATTORNEY.

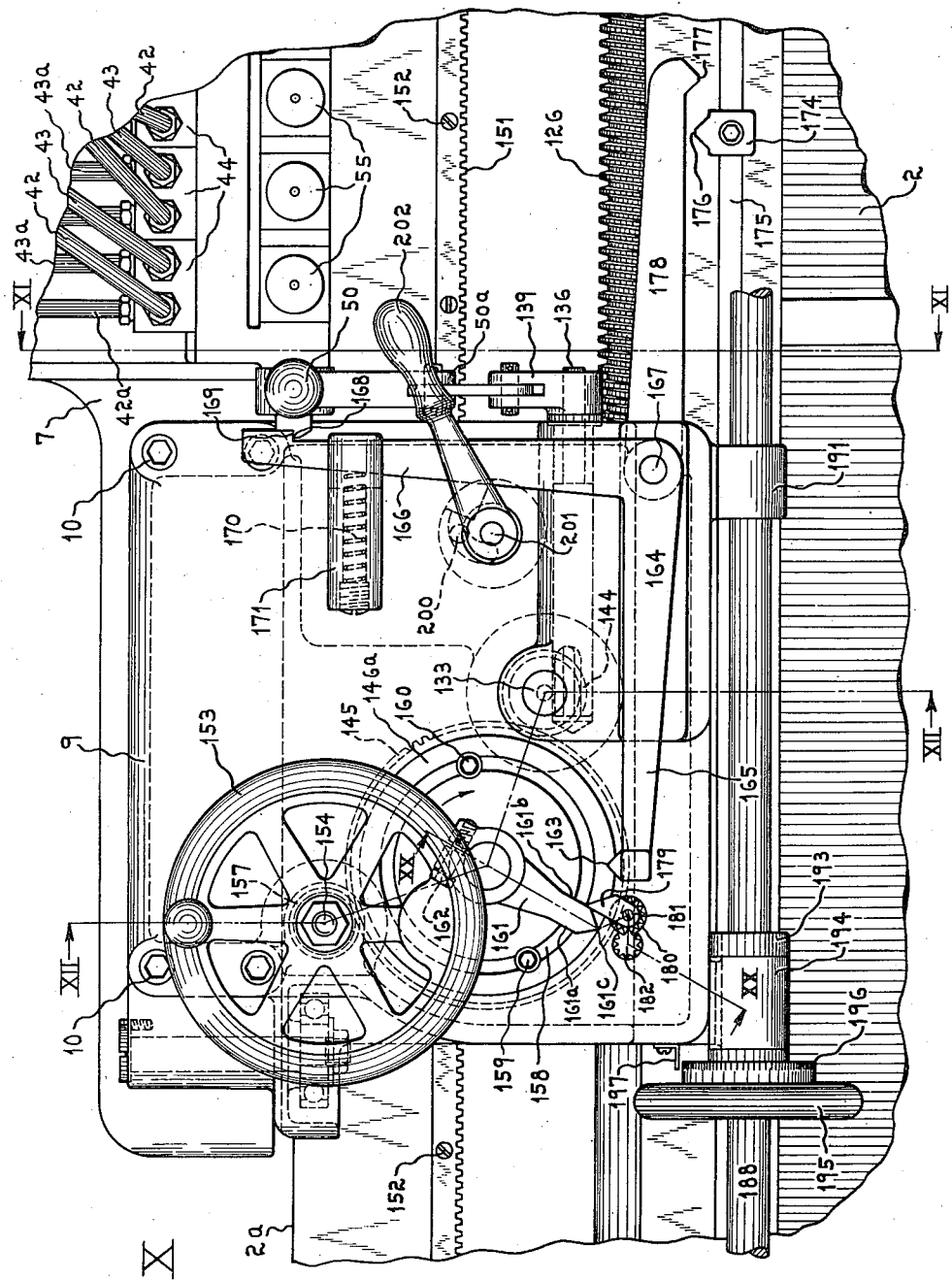

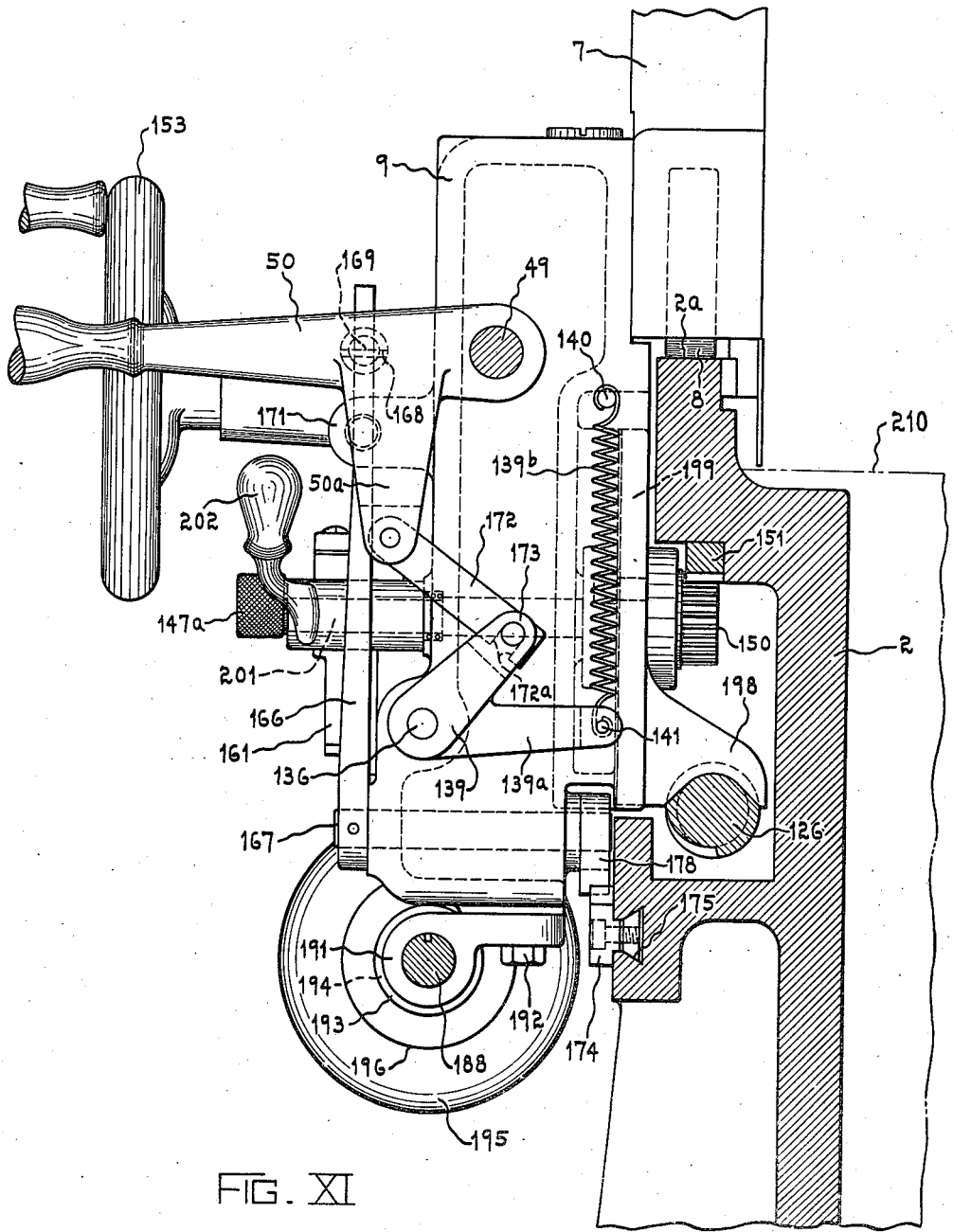
FIG. XI

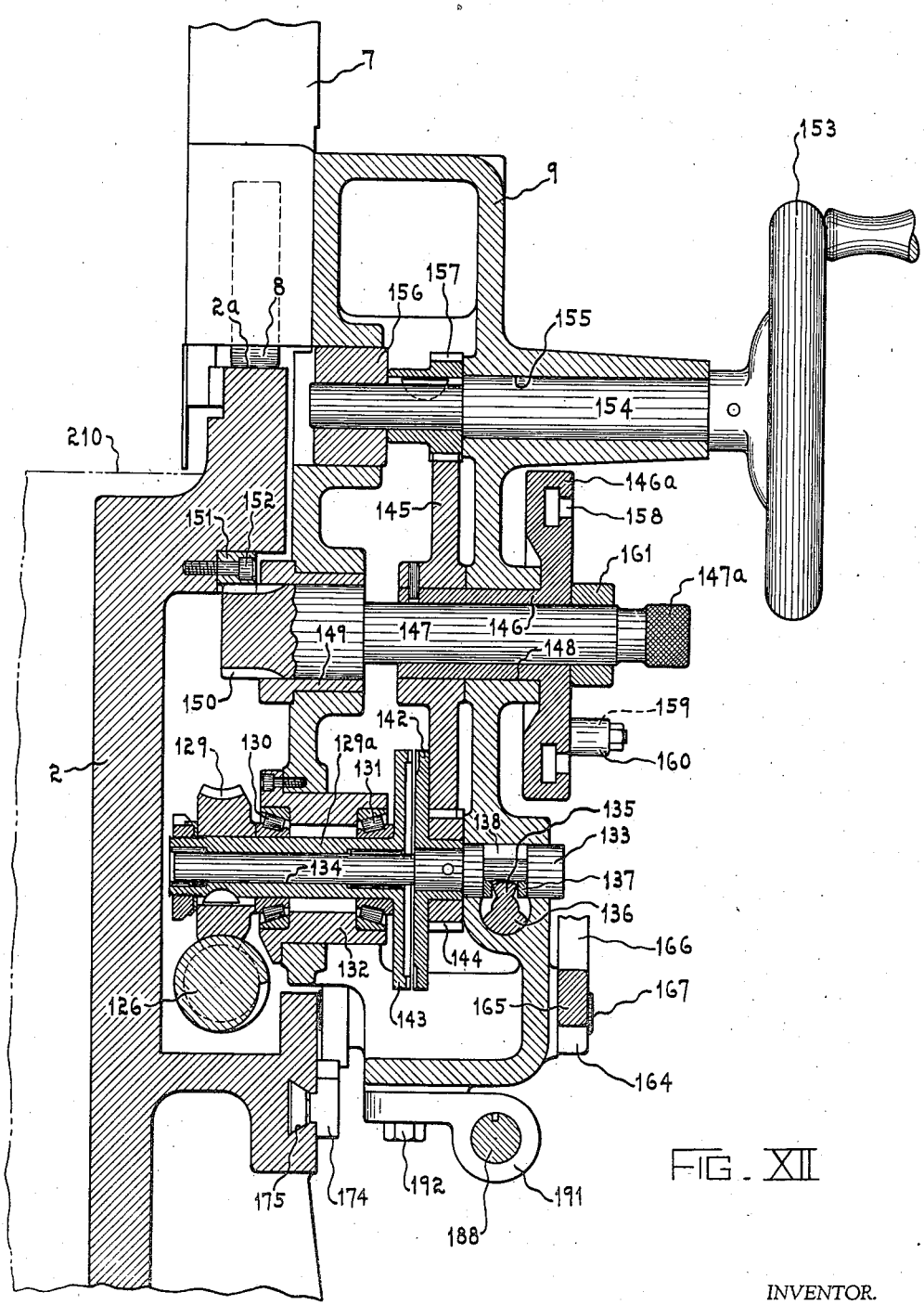

Dec. 2, 1941.  W. F. GROENE  2,264,752
FLAME HARDENING MACHINE
Filed Dec. 24, 1940  17 Sheets-Sheet 13
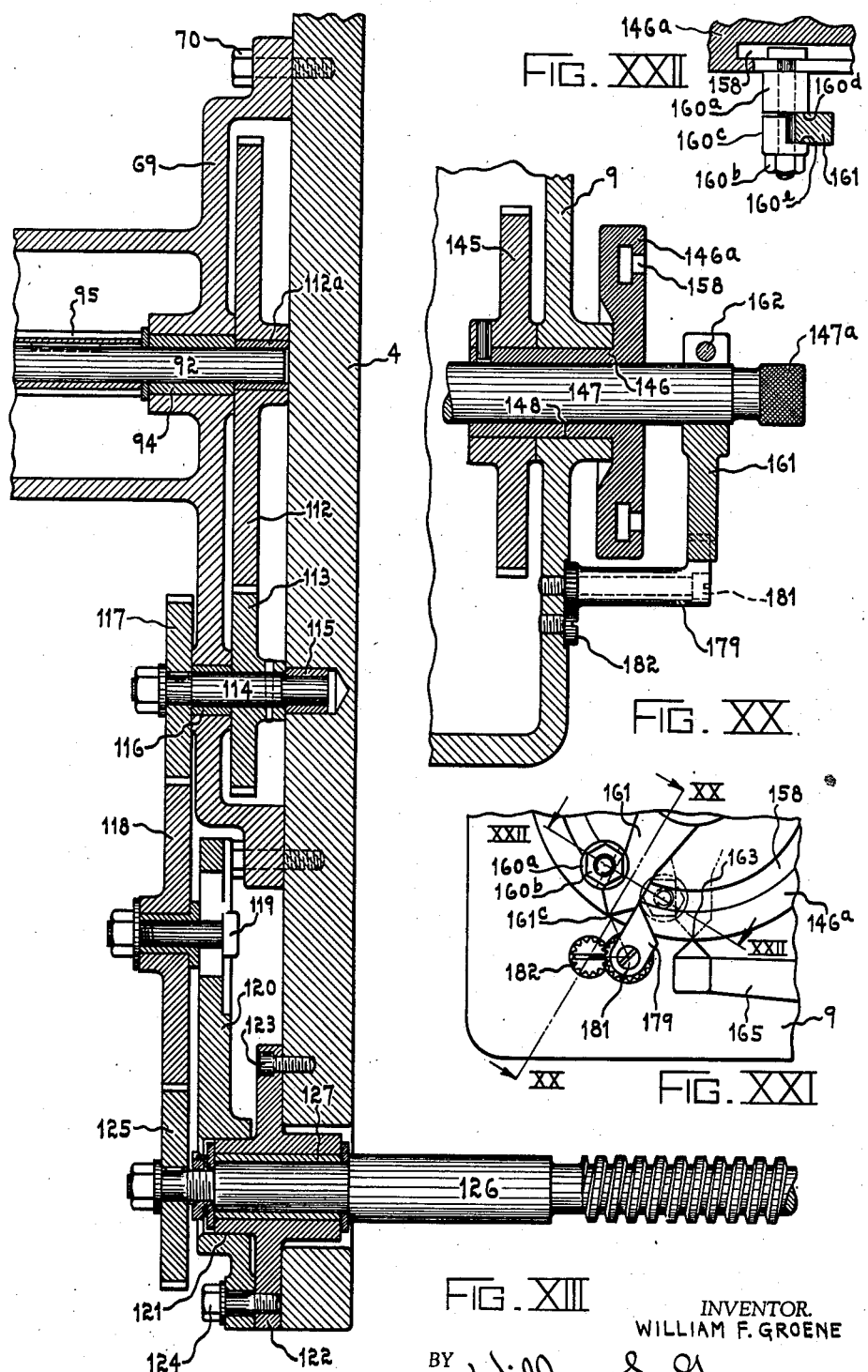
INVENTOR.
WILLIAM F. GROENE
BY Willard S. Groene
ATTORNEY.

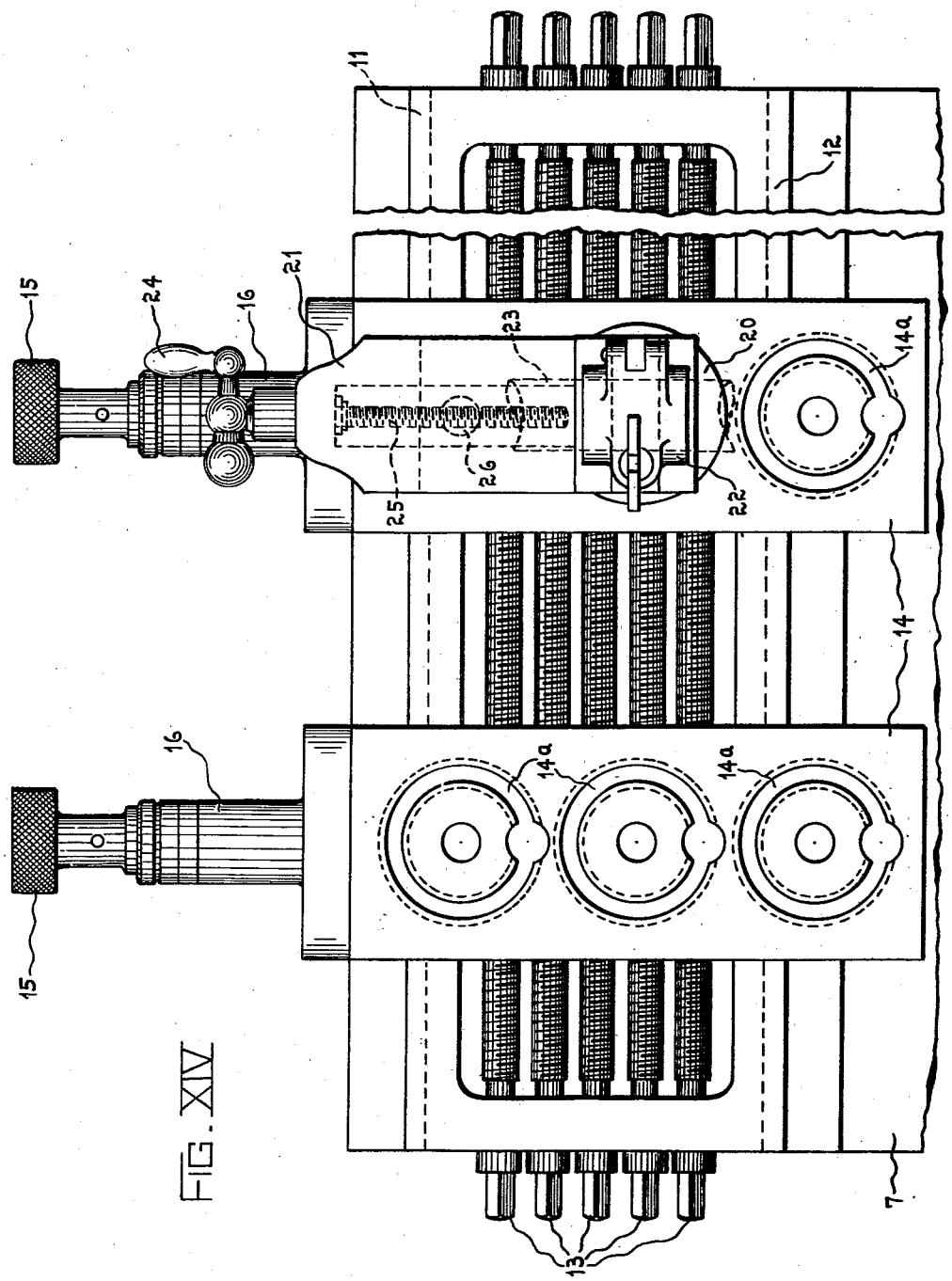

Dec. 2, 1941.  W. F. GROENE  2,264,752
FLAME HARDENING MACHINE
Filed Dec. 24, 1940   17 Sheets-Sheet 15
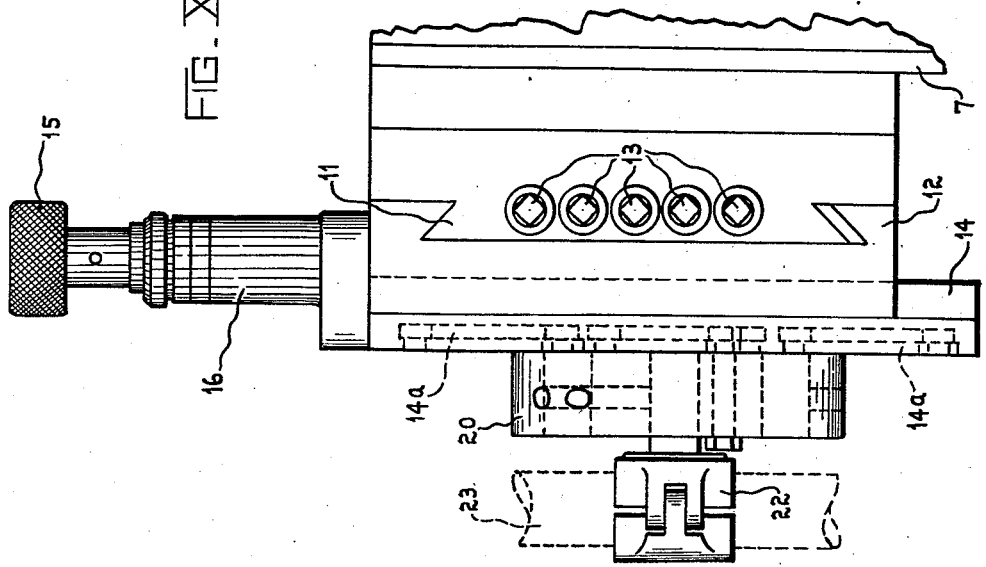
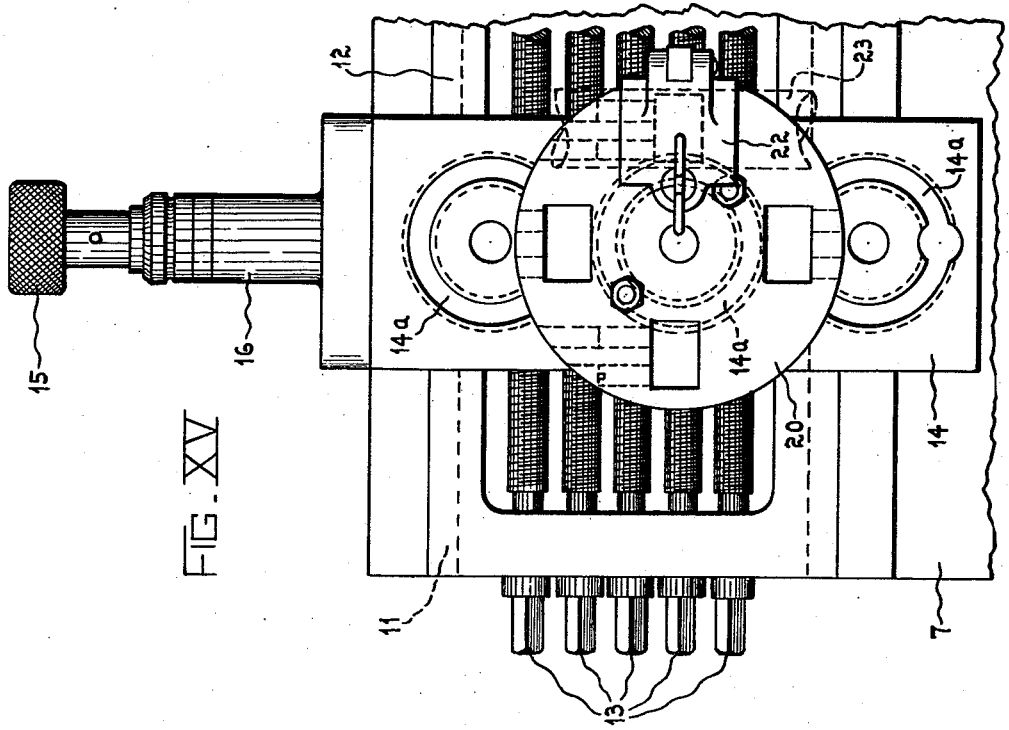
INVENTOR.
WILLIAM F. GROENE
BY Willard S. Groene
ATTORNEY.

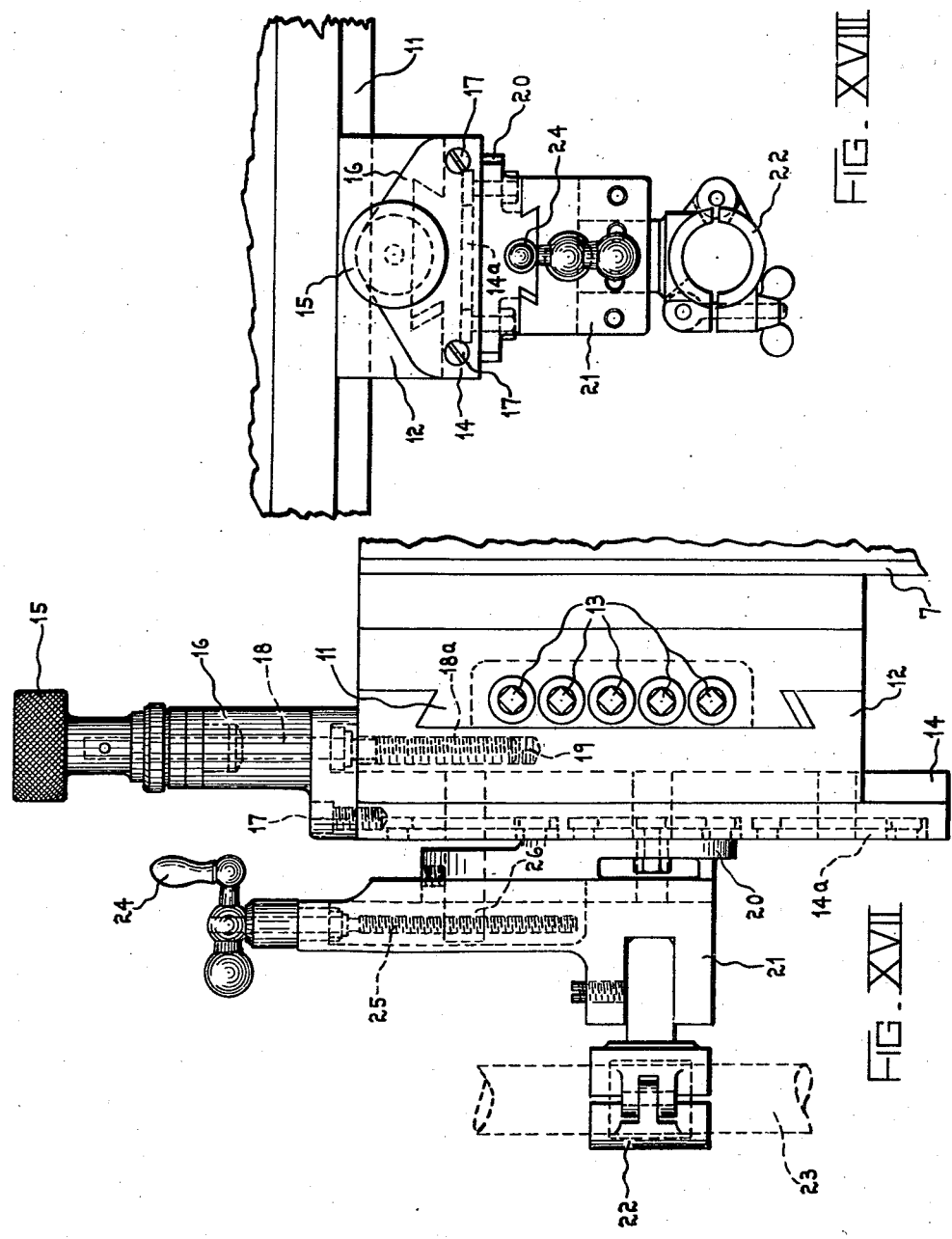

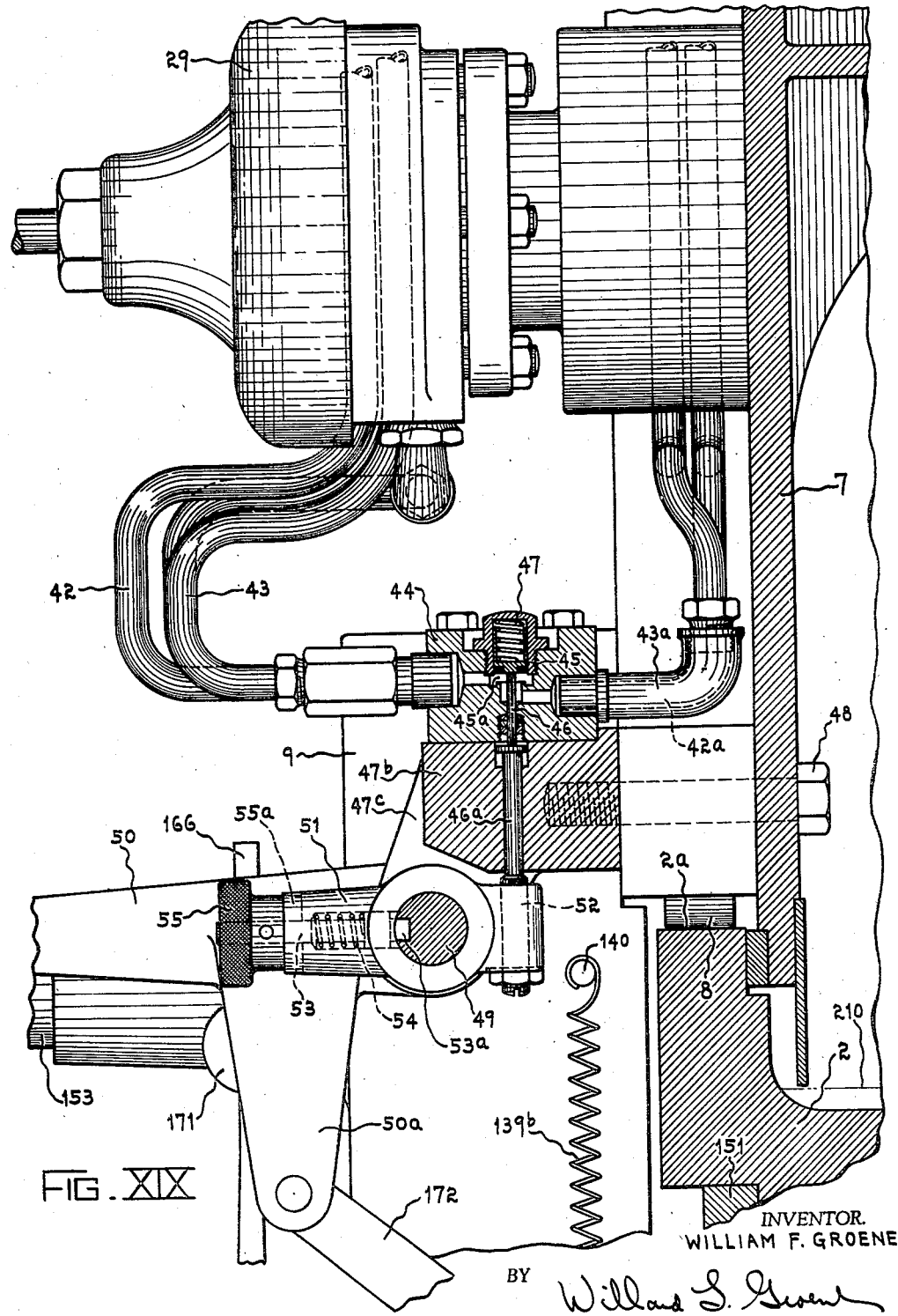

Patented Dec. 2, 1941

2,264,752

UNITED STATES PATENT OFFICE 2,264,752

FLAME HARDENING MACHINE

William F. Groene, Cincinnati, Ohio, assignor to
The R. K. Le Blond Machine Tool Company,
Cincinnati, Ohio, a corporation of Delaware Application December 24, 1940, Serial No. 371,568

18 Claims. (Cl. 266—4)

This invention pertains to a flame hardening machine for actuating flame hardening torches relative to a large variety of different types of work pieces. This machine is of a universal construction whereby different types of work and different types of setups for such work, may be readily effected in a most efficient manner, so that a large variety of the work may be flame hardened with a minimum expense and loss of setup time in getting the machine ready to perform the hardening operations. Heretofore, flame hardening operations have been greatly handicapped by the lack of adequate control of all of the elements involved in the flame hardening process, namely, that of accurately controlling the flow of the gases consisting of the oxygen and the acetylene; the proper control of the coolant associated with the flame hardening torches and the coolant for submerging the work; the accurate control of movement of the flame hardening torches relative to the work; and the rotary motion of the work in instances where such rotary type work pieces are to be flame hardened. It is thus with this idea in mind that the present machine has been devised and incorporates certain specific and novel features which render it more effective than heretofore ever done with respect to controlling the flame hardening processes to be applied to large variety of work pieces.

One object of this machine is to provide an arrangement which is capable of flame hardening both flat work surfaces and also cylindrical or other type rotary work surfaces and it is especially adapted to the such type work pieces as gears, toothed clutches, lead screws, and the like, objects having surfaces of revolution to be flame hardened.

Another object of this invention is to provide a very flexible universal flame hardening machine which is readily adapted to a nicety of control so essential to the successful flame hardening of a large variety of different types of work pieces.

An object of this invention is to provide accessible means operating with the movement of the flame hardening torches for accurately controlling the flow of gases and the coolant medium to said torches in such a way as to be under the instant response and adjustment of the operator in controlling the machine during its operating cycle.

Another object of this invention is to provide adequate and easily adjustable means for effecting the proper rate of relative travel of the flame hardening torches with respect to the work piece being flame hardened.

A further object of this invention is to provide means for actuating the flame hardening torches relative to the work piece and to incorporate, in conjunction with this means, timing mechanism for effecting dwell or delayed periods of relative movement of the torches with respect to the work, which periods may be regulated with a high degree of accuracy and which mechanism also effects the proper movement of the torches relative to the work at the completion of the dwell period. This dwell period is essential to the proper operation of the torches as it is first necessary to initially preheat the beginning edge or surface to be flame hardened on the work before proceeding, at the normal heating rate of the torches along the work in hardening the surface.

A still further object of this invention is to provide automatic means operable by the movement of the torch relative to the work piece or operable by means of the timing device after predetermined intervals for automatically shutting off the gas to the torches for extinguishing the flame at the proper time so as to effect the accurate and precise heating of the work piece by automatic means.

A still further object of this invention is to provide an arrangement wherein a large double compartment coolant tank is provided in which may be submerged relatively long work pieces, such as a lathe bed for flame hardening the various sideway surfaces by relative movement of the torches over the bed ways.

A still further object of this invention is to provide means for rotatively supporting work pieces for application of the flame hardening torches thereto and to provide control means for accurately rotating the work at predetermined rates of rotation and also in certain cases in predetermined rates of rotation relative to the travel of the torches along the work surface so that work pieces such as shafts, screws, and similar type objects, may be flame hardened readily on this machine by simple adjustment.

Another feature of this invention is to provide a novel coolant control system, incorporating the double compartment coolant storage tank, in which one tank is provided above the other, the upper tank being utilized for the working operations, the lower tank serving as the main reservoir for either supplying the top compartment continuously with a full volume of circulating fluid or which may be operated so that the upper tank contains no fluid but acts as the receiver for the fluid which may be distributed from the flame hardening torches as delivered from the lower chamber of the coolant reservoirs.

A still further object of this invention is to provide a flame hardening torch carrying apparatus which contains all of the control valves and pressure regulating valves for all of the torches readily accessible to the operator of the machine so that at all times the operator may have instant control of the gas pressures and coolant flow to the various flame hardening torches, resulting in a high degree of accurate setting for these devices.

Further features and advantages of this invention will appear from the detailed description of the drawings in which:

Figure I is a front view of the machine and shows the general design and location of the various parts.

Figure II is a rear view of the machine of Figure I showing in particular the hose compartment containing the flexible conduits which apply the gases and coolant medium to the flame hardening torches.

Figure III is a left hand end elevation of the machine showing the drive mechanism for the rotating headstock work spindle and the change gear drive for the apron mechanism of the torch carriage.

Figure IV is a right hand end elevation of the machine showing the coolant pumps which furnish the necessary coolant to the parts being treated and controls the supply of coolant to the upper coolant tank.

Figure V is a vertical transverse section through the work rotating headstock substantially on line V—V of Figures III, VI, and VII.

Figure VI is a section through the headstock on the line VI—VI of Figure V.

Figure VII is a section on line VII—VII of Figure V.

Figure VIII is an enlarged fragmentary front view of the carriage showing particularly accessible pressure gages and control valves for the flame hardening torches.

Figure IX is an enlarged rear view of the carriage of Figure VIII showing the various supply pipes for the torches on the torch carriage.

Figure X is a front elevation showing the various automatic and manual controls of the apron mechanism of the torch carriage.

Figure XI is a right hand end elevation of the apron mechanism on line XI—XI of Figure X.

Figure XII is a vertical transverse section substantially on line XII—XII of Figure X showing in particular the gear and clutch drive of the apron.

Figure XIII is a section through the change gear drive on the left hand end of the machine shown by the line XIII—XIII of Figure III.

Figure XIV is a front elevation of the cross rail and adjustable torch holders of the torch carriage showing the arrangement for obtaining different settings for the flame hardening torches.

Figure XV is a front view of one of the torch holders which carry the various flame hardening torches.

Figure XVI is a side elevation of the torch holder shown in Figure XV.

Figure XVII is a side view of the torch holder shown in Figure XIV.

Figure XVIII is a plan view of the torch support shown in Figure XV.

Figure XIX is an enlarged view partly in section shown on the line XIX—XIX of Figure VIII.

Figure XX is an enlarged section shown on line XX—XX of Figures X and XXI.

Figure XXI is a fragmentary view of a portion of the apron and driving disc and finger.

Figure XXII is a section on line XXII—XXII of Figure X and XXI.

The machine comprises a base 1 which forms a rectangular tank for the coolant that is required for the flame hardening operations on top of which is mounted the slab member 1a forming a cover for this tank and serving as a work mounting platform and also forming the bottom part of an upper tank consisting of the side rails 2 and 3 and the end brackets 4 and 5 which are suitably bolted to the slab 1a by the screws 6. These side rails 2 and 3 have the ways or rails 2a and 3a upon which the torch carriage 7 mounted on suitable rollers 8 for movement longitudinally along the upper tank.

On the carriage 7 is mounted the apron 9 by suitable screws 10 having mechanism for controlling the movement of the torch carriage 7 on the rails 2a and 3a as will be described. Formed on the torch carriage 7 is the dovetailed portion 11 carrying the various torch holders comprising the members 12 which can be moved back and forth across the machine by turning its respective adjusting screw 13. Each member 12 contains another dovetailed slide 14 which can be adjusted vertically by turning the knob 15 fixed on the screw 18 journaled against axial movement in the bracket 16 fastened to the slide 14 by the screws 17, the screw 18 having a threaded portion 18a which operates in the threaded bore 19 in the member 12, the torch holder being shown in fully downwardly extended position in Figure XVII. Also in this slide 14 are three arrangements of T slots 14a whereby the swivel slide 20 can be mounted and rotated for quick setup and for positioning the torches at any angle as required by the nature of the work. On this swivel slide 20 is carried the torch holding slide 21 which carries the flames hardening torch holder 22 in which is mounted the blow pipe 23. This torch holding slide 21 can be adjusted on the swivel slide 20 by turning the handle 24 which is connected to the screw 25 journaled against axial movement in the torch holder 21 and operating in the nut 26 fixed in the swivel slide 20.

Thus by this arrangement fully universal and easily operable means is provided for setting the various blow pipes for the flame hardening torches in any desired position to meet any condition demanded by the work surface to be hardened by the machine.

It will thus be noted that in this arrangement each of the individual torch holders 21 may be adjusted horizontally by manipulation of the screws 13; may be adjusted vertically by manipulation of the knob 15; and may be adjusted in angular relationship by appropriately setting the swivel slide 20 and actuating the handle 24 as described.

In addition to this universal setting for each of the individual torch holders, individual control of the flow of the oxygen and acetylene to each of the individual blow pipes 23 carried in these torch holders is effected by apparatus totally carried by the torch carriage 7. Mounted on the front of the carriage 7 are the oxygen pressure control valves 27 having pressure indicating gauges 28 and also on this carriage are mounted the acetylene pressure control valves 29 having associated pressure indicating gages 30.

Oxygen is supplied to the pressure control valve 27, Figure VIII, from the various pipe lines 31 which are connected into the main oxygen supply pipe or manifold 32, Figure IX, carried on the rear of the carriage 7. Similarly the acetylene pressure control valves 29 are connected to the manifold 33 by means of the pipe lines 34. Each of the manifolds 32 and 33 are connected respectively to flexible conduits or hoses 35 and 36 arranged to operate in the respective slots 37 and 38 provided in the conduit box 39 mounted on the rear of the base 1 of the machine, as best seen in Figures II, III, and IV. The outer ends of these conduits are connected to the appropriate acetylene line 41 and the oxygen line 40 fixed on the base of the machine and which are in turn connected to an appropriate source for these gases so that these gases may be supplied at all times to the carriage and pressure gauges 27 and 29 regardless of the relative position or movement of the carriage 7 on the rails 2a and 3a of the base of the machine.

Pressure regulated gas from the respective oxygen regulating valves 27 and acetylene regulating valves 29 pass through the respective pipe lines 42 and 43 into the automatic shut-off valve block 44, an enlarged view of which is shown best in Figure XIX. In each of these valve blocks 44, is provided a shut-off plunger 45 having a projecting stem 46 and which is normally held in closed position by a compression spring 47 so that the lines 42 (or 43) are normally closed from discharging gas into the outlet lines 42a (or 43a). These outlet lines are respectively connected through suitable flexible conduits 47a, Figures VIII and IX, to the respective blow pipes 23 as in conventional practice.

Noting particularly Figure XIX, the valve blocks 44 are each securely mounted on the supporting block 47b which is bolted to the carriage 7 by suitable screws 48 and which carries the actuating plungers 46a for each of these valves in the valve blocks 44, one plunger in each of the control valves being provided for each oxygen and each acetylene line coming from the respective pressure control valves 27 and 29, as described. Formed on this block 47b are the depending bosses 47c, in which is journaled a rock shaft 49 to which is rigidly fixed the operating handle 50. Also journaled on this shaft is a series of valve actuating levers 51 having appropriate abutment set screws 52 which engage the plungers 46a in the block 47b which in turn actuates the plungers 46 in the valve blocks 44. Also formed on these valve actuating levers 51 is a spring urged plunger 53 having a projecting end portion 53a arranged to engage in appropriate detent holes provided in the shaft 49, and normally urged into said detent hole by means of the compression spring 54. Also mounted on this plunger 53 is a pull knob 55 having a tongue portion 55a arranged to engage in a mating slot formed in the member 51 so that as the knob 55 is pulled outwardly and slightly rotated, the plunger 53 will normally be prevented from engaging in the mating hole provided in the shaft 49, so that it will not be operated by the rocking motion of the shaft 49. One of these valve actuating levers 51 is provided for each pair of valves in each of the valve blocks 44, so that each group of oxygen and acetylene control mechanism may be independently operated or allowed to remain inoperative or may all be operated simultaneously by appropriately rendering the control lever 51 in proper connection on the shaft 49, so that as the lever 50 is actuated, the valve may be opened to permit the gas from the various pressure control valves to go to their respective blow pipes and torches mounted on said blow pipes. In this arrangement, therefore, by pressing the lever 50 downwardly, the valves will be opened and by allowing the lever to return upwardly under the influence of the springs 47 in the valve block 44, the gas will automatically be shut off from the various blow pipes. Likewise by appropriately manipulating the knob 55 different groupings of the valves may be rendered operative or inoperative as desired and it is also possible to have some of the valves operated by the shaft 49 and then to later on render other valves operative by merely depressing the lever 51 until the end 53a of the plunger 53 engages into the shaft 49, so that these valves will then be rendered operative and transmit gas to their respective burners.

Coolant supply for the flame hardening torches is also provided by means of a source of coolant liquid which is transmitted through the pipe line 56 to the respective conduit hose 57 to the coolant supply pipe 58 carried by the carriage 7, from which issue the various flexible coolant conduit hoses 59 for discharging their coolant fluid to the various blow pipes as in conventional practice. Also provided on this carriage is a pilot light gas supply which is delivered through the pipe line 60 from a suitable source of gas through a flexible hose 61 to the pilot light gas line 62 mounted on the carriage 7 and from which suitable pilot light gas tubing may be connected and arranged to be in proper position relative to the flame hardening torches for lighting them with the greatest degree of ease and safety.

Power for actuating the work rotating mechanism and for feeding the torch carriage 7 along on the rails 2a and 3a is derived from the main drive motor 63 which is mounted on the left hand end of the base 1 of the machine and drives the pulley 64, Figure VI, through suitable V belts 65 so as to rotate the pulley shaft 66 mounted in appropriate bearings 67 and 68 in the headstock housing 69 which is appropriately bolted by suitable screws 70 to the left hand end plate 4 of the upper tank of the machine. Noting particularly Figure V, VI, and VII, low speed power take off from the pulley shaft 66 is transmitted from the pinion 71 fixed on the shaft 66 which drives the gear 72 fixed on the worm shaft 73 journaled in appropriate bearings 74 and 75 in the housing 69 and has mounted on it, a worm 76 which is arranged to drive the worm wheel 77 appropriately journaled on the shaft 78 also mounted in suitable bearings 79 and 80 in the housing 69 so that this worm wheel 77 will be rotated at relatively slow speed on the shaft 78. Also on the outer end of the pulley shaft 66 is provided a change gear 81 which in turn drives a change gear 82 on the spiral gear shaft 83 journaled in suitable bearings 84 and 85 in the housing 69 and which shaft 83 has fixed on it a spiral gear 86, which in turn is arranged to drive the spiral gear 87 appropriately journaled on the shaft 78 so that this gear 87 will be rotated at a relatively rapid rate of speed. Proper selection of change gears in place of the gears 81 and 82 will, of course, effect different rates of relative rotation of the shaft 66 and the spiral gear 87 as desired to meet different conditions of operation.

On the shaft 78 is provided a slidingly drivingly mounted clutch member 88 which may be moved back and forth to engage either the worm wheel 77 or the spiral gear 87 in driving relationship on the shaft 78 by appropriately manipulating the control lever 89, Figure VI, so that the shaft 78 may either have a high speed drive or a low speed drive as required.

On the shaft 78 is fixed the gear 90 which drives a gear 91 fixed on the shaft 92 appropriately journaled in suitable bearings 93 and 94 carried in the housing 69. Fixed also on this shaft 92 is a relatively long driving pinion 95 which is constantly in mesh with the gear 96 of the triple gear 97 comprising the gears 96, 98, and 99 which triple gear is appropriately journaled on a shaft 100 carried in the housing 69. These gears 96, 98, and 99 are arranged to engage corresponding gears 101, 102, and 103, fixed on the work spindle 104 which in turn is journaled in suitable bearings 105 and 106 carried in the housing 69. Thus by appropriately sliding the gear 97 on its shaft 100 so as to respectively engage the various gear combinations 98—101, 96—102, or 99—103 various different speeds of rotation of the work spindle 104 may be effected in relation to the shaft 100. By means of the above apparatus just described, various spindle speeds may thus be effected in the work carrying spindle 104. This work spindle is provided with a center 107 for rotatively supporting a work piece in conjunction with a similar center 108, Figures I and II, appropriately carried in a movable tailstock barrel 109 carried in the tailstock housing 110 which is adjustably mounted on the base plate 1a in the usual or conventional manner, so that the work may be supported between these centers 107 and 108 for rotation which is effected by suitable driving means connected to the work and to the work spindle 104 as in an ordinary lathe.

Power for operating the mechanism in the apron 9 is derived from the gear 111 fixed on the work spindle 104 which drives the gear 112 journaled on a suitable bearing 112a on the end of the shaft 92 and which gear 112, Figure XIII, in turn drives a gear 113 fixed on the stub shaft 114 journaled in a bearing 115 in the end plate 4 and in the bearing 116 in the housing 69. On the outer end of the shaft 114 is provided a change gear 117 which is adapted to engage a change gear 118 appropriately mounted on the adjustable studs 119 on the change gear segment 120, which is journaled around the bearing portion 121 of the bracket 122 appropriately fixed on the end plate 4 by suitable screws 123 and adapted to be clamped in adjusted position for proper gear engagement by the locking screw 124. The gear 118 is arranged to drive the gear 125 fixed on the end of the combined feed and lead screw 126 journaled in the bearing 127 carried in the bracket 122 and journaled at its other end in a suitable bearing 128 carried in the right hand side plate 5 of the upper coolant tank, Figure I. Thus this screw 126 may be rotated at a series of different speeds relative to the spindle rotation and its predetermined relationship thereto by properly selecting the change gears 117—118—125 as desired.

Noting particularly Figures X, XI, and XII, engaging the screw 126 is a worm wheel 129 fixed on the clutch sleeve 129a which is carried in suitable bearings 130 and 131 in a bushing 132 fixed in the apron housing 9 so that when the screw is rotated and the apron held against relative movement along the bed of the lathe, the sleeve 129a will be driven in rotating movement. Coaxially mounted with the sleeve 129a is the clutch feed shifter shaft 133 which is journaled in the bore 134 of the sleeve 129a and is arranged to be actuated axially by means of the single tooth 135 on the rock shaft 136 which operates with a shoe 137 in the annular slot 138 formed in this shaft 133. The rock shaft 136 has fixed to it an appropriate bell crank lever 139 having an arm 139a which is connected to a pin 140 fixed to the housing 9 of the apron while the other end is connected to a pin 141 in the end of the arm 139a, so that the shaft 133, as seen in Figure XII, will normally be urged to the right to cause the clutch disk 142 fixed thereto to be normally disengaged from the clutch 143 formed on the sleeve 129a.

Also fixed to the shaft 133 and the clutch member 142 is the gear 144 which in turn drives the gear 145 fixed to the disk sleeve 146 which is journaled on the rack pinion shaft 147 and also takes a bearing in the bore 148 in the apron housing 9, the rack pinion shaft also being journaled in a suitable bearing 149 in the housing 9 adjacent to its pinion 150 which is arranged to engage a rack 151 fixed on the front plate 2 of the upper coolant tank of the machine by suitable screws 152. The rack pinion shaft has a knurled pull knob 147a, by which the rack pinion 150 may be withdrawn to the right, Figure XII, from the rack 151 by axially sliding the shaft 147 in the bearing 149 and in the bore of the sleeve 146. A suitable hand wheel 153 mounted on a shaft 154 journaled in the bore 155 of the apron housing 9 and supported in a suitable bearing 156 therein, has a pinion 157 fixed thereto, which is arranged to drive the gear 145 for manual operation of this gear and rotation of the driving disk 146a of the sleeve 146.

Formed in this disk 146a is an annular T slot 158 by which dogs 159 and 160 may be clamped at various positions around the disk. Also adjustably mounted on the rack pinion shaft 147 is the actuating and tripping finger 161, having a clamping screw 162 whereby it may be clamped in any circumferential position on the shaft 147 and relative to the dogs 159 and 160 on the disk 146a. The object of this arrangement is to provide means through the medium of the dogs 159 and 160, which are carried around by the disk 146, driven from the screw 126 described, causing these dogs to engage the side portions 161a, and 161b, carrying this finger around thereby rotating the rack pinion shaft 147 and when it is in engagement with the rack 151 to thereby cause the apron 9 and the carriage 7 to be fed along on the ways 2a and 3a of the tank to effect the relative feeding of the flame hardening torches with respect to work held in the machine.

The object of this arrangement of the dogs 159 and 160 and the driving finger 161 is to provide means for beginning the feed at any predetermined position by relatively setting the finger 161 with respect to the dogs and also to provide an automatic dwell or delay in the actual pickup of the feed of an accurate predetermined length in order to facilitate the flame hardening operation. It has been found in flame hardening a piece of work, for example, a flat slab having an edge over which the flame is first to proceed and then continue along the surface, that it is desirable to have the torch dwell or rest in non-movement at the beginning of the feeding cycle so as to initially bring the work up to flame hardening temperature before proceeding with the actual continuous movement of the burner across the work. This is provided by means of this apparatus as follows:

Noting Figure X, the driving disk 146a normally rotates clockwise, as shown in this figure, to effect feeding of the carriage 7 to the left to cause relative movement of the flame hardening torches over the work. In order to effect the proper dwell for the initial starting of the flame hardening cycle, the finger 161 is first positioned with its surface 161a against the dog 159 which is set in a predetermined circumferentially displaced position relative to the dog 160 to give a definite time interval of dwell so that as the disk rotates, moving the dog 159 away from the surface 161a and bringing the dog 160 up against the surface 161b of the finger 161, a predetermined dwell is first initially set up for the carriage 7 so as to preheat the work to proper flame hardening temperature and as the dog 160 engages the surface 161b of the finger 161, the actual feeding of the carriage then automatically begins to take place and continues to the completion of the flame hardening operation.

At the completion of this cycle, or just before the wind up of the actual cycle as the burner approaches the end edge of the work, means is provided to prevent burning of this edge by the flame, so that the flame is turned off automatically just prior to the time it would axially arrive at the edge of the work surface. This arrangement is provided by the tip 161c of the finger 161 engaging the tip 163 of the feed and burner cut off lever 164 comprising the bell crank arms 165 and 166 which lever is fixed on a rock shaft 167 suitably journaled in the apron housing 9. This lever arm 166 has a latch surface 168 which is arranged to engage over a mating latch surface 169 of the valve control lever 50 and is normally urged into latching engagement therewith by means of a suitable compression spring 170 carried in the boss 171 of the apron 9, so that as the lever 50 is pressed downwardly to open the various valves in valve blocks 44, the lever 50 will thereby be automatically latched into valve open position.

It is to be also noted that on the lever 50 is a projection 50a to which is connected the link 172 which is similarly connected to the arm 173 of the bell crank lever 139 on the rack shaft 136 so that as the lever 50 is moved downwardly, the feed clutches 142 and 143 will be automatically engaged to effect the driving motion of the carriage and apron 9 along the ways 2a and 3a of the machine tank. Thus as the lever 50 is pushed down, the gas valves automatically opened, and the feed started, the lever 50 is held into position by the latch 168—169 and as the flame hardening torch approaches the end edge of the work, the finger 161 will be so positioned as to cause its end 161c to strike the end 163 of the lever arm 165 releasing the latch 168—169 allowing the lever 50 to return upwardly to its normal valve closed position and likewise through the linkage 172 and the lever 139, to disconnect the feed as effected by the tension spring 139b.

The tripping of the feed and extinguishing of the torches by turning off the flames of the torches by turning off the fuel just prior to the end of the flame hardening cycle as the carriage 7 moves longitudinally of the tank may also be effected by engagement of a dog 174, Figures X and XI, which is mounted in an appropriate dove tail slot 175 formed in the front plate 2 of the tank, which has a tip 176 arranged to engage the tip 177 of the lever 178 also fixed on the rock shaft 167, so as to similarly effect the tripping of the feed and flame shut off valves as described.

Another feature of this invention lies in the fact that the disk 146a may at certain times be utilized as an accurate timing device for effecting the time cycle for application of the flames of the torches to a work piece which might be rotating on the work spindle but in which there is no relative movement of the carriage or torches with respect to the work, as for example, in face hardening clutches or similar articles. Under these conditions the rack pinion shaft 147 is pulled out by means of the knob 147a so that its rack pinion 150 will be inside of the bearing 149 and disengages the rack 151. Under these conditions, the disk 146a will not be utilized for any driving function so that the dogs 159 and 160 will be dispensed with. An initial setting or locating dog 179 is then inserted in the counterbore 180 and locked in place by means of an appropriate screw 181 and held against rotation from the position shown in Figures X, XX and XXI, by means of a serrated screw 182 also fixed in the apron housing so as to be in position to engage the surface 161b of the finger 161. Under these conditions a clamping dog 160a, Figures XX and XXII, is mounted in the T slot 158 in the disc 146a so that when the nut 160b is tightened down, the member 160c of this dog will clamp the finger 161 between the surfaces 160d and 160e causing the finger to travel around, so as to effect a driving with the disc 146a.

The object of the dog 179 is to give a starting point for the beginning of movement of the finger 161 until it is carried around to point shown in Figure XXI, where its end 161c engages the end 163 of the lever arm 165 to effect tripping of the lever 50 to shut off the gas to the various flame hardening torches after a predetermined interval of time has elapsed, there being no relative movement of the carriage 7 under these conditions since the rack pinion 150 is withdrawn from the rack 151. The standard amount of movement from the dog 179 around almost a complete circle of revolution until its end 161 strikes the tip 163 of the lever arm 165 may be varied with accuracy to any predetermined amount by appropriately selecting the proper change gears 117—118—125 and by appropriately adjusting the shifting levers 89 and 97a which respectively actuate the clutch 88 and the triple gear 97. Thus, under these conditions an accurate timing device is automatically rendered effective by utilizing the movement of this finger 161 as described.

In order to effect a greater degree of variety of feed variations necessary to the proper testing and hardening of various different types of work, a rheostat control is also provided for the main drive motor 63. This rheostat 183 is appropriately mounted on a suitable bracket 184 on the left hand end of the machine and has a sprocket 185 over which passes a chain 186 operating over the sprocket 187 on the longitudinal rheostat control rod 188 passing along the length of the bed. This rheostat control rod is appropriately mounted in bearings 189 and 190 in the end plates 4 and 5 respectively and also is supported slidingly in a projecting lug 191 mounted on the apron 9 by suitable screws 192 and also is slidingly mounted in keyed relationship in the hand wheel bushing 193 which is rotatably mounted in the lug 194 and guided therein against axial movement. On this sleeve 193 is provided a hand wheel 195 having suitable graduations 196 and an indicating pointer 197 associated therewith whereby the setting of the rheostat 183 may be at all times effected from the apron of the lathe conveniently located to the hand of the operator. Thus in addition to the change gear and speed change gearing described, it is possible to also vary the speed of the motor within certain limits to give a variety of speeds of rotation for the work spindle or feed motion to the carriage 7 to meet any possible conditions of flame hardening operations required.

In addition to the normal feeding apparatus just described, a half nut 198, Figures X and XI, is provided, which is free to move vertically up and down on the innerface of the apron 9 in suitable guideways 199 and is actuated in said guideways by the usual scroll cam 200, Figure X, carried on the rock shaft 201 journaled in the apron housing 9 and actuatable by means of the manual control handle 202, whereby it may be lowered into engagement with the screw 126 or raised from engagement therewith. When this member is engaged with the screw 126 the other feed driving mechanism described is rendered inoperative by disengagement of the clutches 142 and 143. At this time the link 172 which has the slotted portion 172a is swung upwardly out of engagement with the pin in the end of the lever 173 so that the lever 50 may be operated for controlling the gas valves without interfering with the operation of the normal feeding mechanism thereby permitting the half nut 198 and screw 126 to perform the entire function of actuating the carriage 7 in a very accurate rate of travel along the bed in cases where lead screws are to be flame hardened while being rotated in a definite relationship of spindle rotation to the movement of the carriage relative to the work being flame hardened.

A constant accurately regulated supply of coolant for the flame hardening torches is provided by the motor driven pump 203 Figure IV, which is mounted on the right hand end of the base 1 of the machine and is connected to the flame hardening torches through the pipe line 56 connected to the output side of the pump 203. Coolant liquid may be drawn by this pump from either the upper or lower chambers or tanks of the fluid reservoirs of the machine depending upon the type of operation being undertaken in instances where the work is to be totally submerged, coolant would be drawn by this pump 203 through the line 204, Figure II, from the top chamber of the coolant supply reservoir whereas in instances where the work was not to be submerged but was to be completely cooled by coolant from the burners, liquid would be drawn in through the line 205 from the lower tank, these two lines being rendered effective by appropriately regulating the shut-off cocks 206 and 207.

In addition to the pump 203 is the large volume rapid delivery pump 208 which is capable of very rapidly withdrawing fluid from the lower chamber and putting it into the upper reservoir for quickly submerging work preparatory to flame hardening it while at all times maintaining liquid in this upper chamber at the level of the overflow pipe 209 as indicated by the water level line 210, while at the same time providing a maximum of circulation of the fluid in the upper and lower chambers to give proper distribution of the heat and cooling effect to the work during the flame hardening operation. Fluid may be quickly drained from the upper tank into the lower tank by merely raising the overflow pipe 209 from its socket 211 at the bottom of the base plate 1a allowing the liquid to rapidly drain back into the lower tank preparatory to taking work out of the machine and re-inserting a new piece into the upper cooling tank, thus greatly facilitating the mounting and removal of work from the machine.

The work spindle of the headstock 104, as best seen in Figure V, is also cooled so that work being hardened on it will not transfer heat nor will the heat from the acetylene torches be transferred to the mechanism in the headstock through the lathe spindle. This cooling device comprises the finned portion 212 formed on the work spindle which is surrounded by two half segments 213 which nicely fit around and ride on the surfaces 214 of the work spindle and are held in position there around by a suitable metal ring 215, so as to form a chamber 216 in which coolant may circulate. Coolant is supplied to this chamber through the ring 215 from a suitable pipe line 217 which is connected to the fitting 218 of the output side of the coolant circulating pump 208 Figure IV, so that at all times to provide an abundant supply of coolant to this work spindle during the flame hardening operation to remove any heat which may be transferred to it which might otherwise warp or damage the gear driving mechanism in the headstock housing 69. Excess coolant delivered to this chamber may be exhausted through the discharge line 219 back into the upper tank chamber.

Having thus fully set forth and described my invention what I claim as new and desire to secure by United States Letters Patent is:

1. In a flame hardening machine, a pair of coolant reservoirs, one mounted above the other, a flame hardening torch carrier mounted for movement above the upper reservoir, means for mounting work in said upper reservoir, means for rapidly transferring fluid from one to the other of said reservoirs, and means for driving said carrier along said upper reservoir at predetermined rates of travel.

2. In a flame hardening machine, a coolant reservoir, means for mounting work in said reservoir, a flame hardening torch carriage movable over said reservoir, gas pressure regulating valve mounted on said carriage, means for connecting said pressure regulating mechanism to flame hardening torches mounted on said carrier, and means for flexibly connecting a source of gas to the pressure regulating mechanism on said carrier, and means, mounted on the frame of said machine, for moving said carrier along said coolant reservoir.

3. In a flame hardening machine, a frame, a coolant reservoir in said frame, a flame hardening torch carrier movable on said fluid reservoir, flame hardening torches mounted on said carrier, an oxygen pressure regulating valve mounted on said carrier for each of said torches on said carrier, an acetylene pressure regulating valve mounted on said carrier for each of said torches, means for connecting said valves to said torches, a high pressure source of oxygen flexibly connected to said oxygen regulating valves, a high pressure source of acetylene flexibly connected to said acetylene pressure regulating valves, and means for moving said carrier on said coolant reservoir.

4. In a flame hardening machine, a frame, work holding mechanism on said frame, a flame hardening torch carrier arranged for movement on said frame, a series of flame hardening torches mounted on said carrier, oxygen pressure control valves, one for each torch, mounted on said carrier, acetylene pressure control valves, one for each torch, mounted on said carrier, means for connecting said pressure regulating valves to cut-off valves, means for connecting each of said cut-off valves to one of said flame hardening torches, a source of oxygen and acetylene connected to said pressure regulating valves, and means for individually or collectively rendering said cut-off valves operative.

5. In a flame hardening machine, a frame, work holding mechanism on said frame, a flame hardening torch carrier arranged for movement on said frame, a series of flame hardening torches mounted on said carrier, oxygen pressure regulating valves, one for each torch mounted on said carrier, acetylene pressure regulating valves, one for each torch mounted on said carrier, means for connecting one of each of said oxygen and acetylene pressure regulating valves to cut-off valves, means for connecting each of said cut-off valves to one of said flame hardening torches, a source of oxygen and acetylene flexibly connected to said pressure regulating valve for said gases, and means for rendering said cut-off valves individually or collectively operative by the movement of said carriage on said frame.

6. In a flame hardening machine, a frame, work holding mechanism on said frame, a flame hardening torch carrier arranged for movement on said frame, a series of flame hardening torches mounted on said carrier, oxygen pressure control valves, one for each torch, mounted on said carrier, acetylene pressure control valves, one for each torch, mounted on said carrier, means for connecting one of each of said oxygen and acetylene pressure regulating valves to cut-off valves, means for connecting each of said cut-off valves to one of said flame hardening torches, a source of oxygen and acetylene flexibly connected to said pressure regulating valves, means for individually or collectively rendering said cut-off valves operative, means for rendering said cut-off valves operative by the movement of said carriage on said frame, and manual control means for each of said cut-off valves for selecting predetermined different times of operation of each of said cut-off valves independent of the relative movement of said carrier on said frame.

7. In a flame hardening machine, a frame, work holding mechanism on said frame, a flame hardening torch carrier arranged for movement on said frame, a series of flame hardening torches mounted on said carrier, oxygen pressure control valves, one for each torch, mounted on said carrier, acetylene pressure control valves, one for each torch, mounted on said carrier, means for connecting one of each of said oxygen and acetylene pressure regulating valves to cut-off valves, means for connecting each of said cut-off valves to one of said flame hardening torches, a source of oxygen and acetylene connected to said pressure regulating valves, means for individually or collectively rendering said cut-off valves operative, a quenching fluid distributing manifold mounted on said carrier, means for connecting fluid from said manifold to each of said flame hardening torches, means for connecting a source of coolant fluid to said manifold, and means, independent of said cut-off valves, for continuing the flow of coolant fluid to said flame hardening torches after said flames have been extinguished by operation of said cut-off valve.

8. In a torch carrying member for flame hardening machines, an inverted U shaped torch carrying housing having relative movement on the frame of said machine, a horizontal rail mounted on said housing, a series of horizontally movable members mounted on said rail, one for each torch to be carried by said flame hardening torch carrying housing, a series of vertically reciprocatable slides mounted on each of said horizontally moving members, a swivel slide mounted on said vertically movable members, a movable slide mounted on said swivel slide, and means on said last mentioned slides for mounting flame hardening torches.

9. In a flame hardening machine, a frame, a flame hardening torch carrier movably mounted on said frame, a source of power for moving said carrier on said frame, transmission mechanism connected to said power means and to the frame of said machine for effecting said movement, a source of oxygen and acetylene supply for flame hardening torches mounted on said carrier, cut-off valve mechanism interconnected between said source of oxygen and acetylene and said flame hardening torches for cutting off said fuel supply therefrom, common means for disconnecting said source of power from said transmission and for closing off said cut-off valves, and means driven by said transmission for actuating said common means when said transmission is disconnected from driving engagement with said frame of the machine.

10. In a flame hardening machine, a frame, a flame hardening torch carrier movably mounted on said frame, an apron transmission mechanism mounted on said carrier, means for driving said transmission, means for connecting or disconnecting said transmission to the frame of said machine to effect a driving connection therebetween for moving said carriage along said frame, a source of fuel for flame hardening torches mounted on said carrier, a cut-off valve mechanism interconnected between said source of fuel and said flame hardening torches for cutting off said fuel supply from said torches, means for rendering said cut-off valve operative or inoperative, means for latching said valve in open position by manual manipulating means, and means driven by said apron transmission for tripping the latch for said valve to allow it to move to closed position when said apron transmission is disconnected from said frame.

11. In a flame hardening machine, a frame, a flame hardening torch carrier mounted on said frame, a source of power for moving said carrier on said frame, a transmission mechanism interconnecting said source of power and an apron transmission mechanism carried by said flame hardening torch carrier, means for connecting said source of power to said apron transmission, means for connecting said apron transmission to said frame to effect relative movement of said carriage thereon, means for disconnecting said apron transmission from engagement with said frame while continuing to drive it from said source of power, a source of fuel for the flame hardening torches mounted on said carrier, a cut-off valve interconnecting said source of fuel and said flame hardening torches and means for tripping said cut-off valve by the operation of said apron transmission when disconnected from engagement with the frame of said machine.

12. In a flame hardening machine, a frame, a flame hardening torch carrier mounted on said frame, a source of power for moving said carrier on said frame, an apron transmission mechanism carried by said flame hardening torch carrier, means for connecting said source of power to said transmission, and means for connecting said transmission to said frame to effect relative movement of said carriage thereon, means for disconnecting said transmission from engagement with said frame while continuing to drive said transmission from said source of power, a source of fuel for the flame hardening torches mounted on said carrier, a cut-off valve interconnecting said source of fuel and said flame hardening torches, means for shutting off said cut-off valve by the movement of said transmission after a predetermined period of time has elapsed from the time said transmission has been connected to said source of power.

13. In a flame hardening machine, a frame, a flame hardening torch carrier movable on said frame, a transmission mechanism mounted on said carriage, a source of power for driving said transmission, means for connecting said transmission to said frame of said machine, means in said transmission for connecting or disconnecting power from said source of power to said transmission, a source of fuel for flame hardening torches mounted on said carrier, a cut-off valve interconnected between said source of fuel and said torches whereby this fuel may be cut-off from said torches, and means operated by the movement of said transmission as actuated from said power means, when said transmission is disconnected from engagement with said frame, for simultaneously operating said cut-off valve and disconnecting said source of power from said transmission.

14. In a flame hardening machine, a frame, a flame hardening torch carrier movably mounted on said frame, a transmission mechanism mounted on said carrier, power means for driving said transmission, means for interconnecting said transmission with the frame of said machine whereby said source of power affects movement of said carriage on said frame, a source of fuel for the flame hardening torches mounted on said carrier, a cut-off valve interconnected between said source of fuel and said flame hardening torches for controlling the flow of said fuel to said torches, means for connecting or disconnecting said source of power to said transmission, and common means for simultaneously opening said cut-off valve and connecting said source of power to said transmission whereby said carriage is simultaneously started to feed and fuel is supplied to the flame hardening torches to begin the flame hardening operation.

15. In a rotary work supporting device for flame hardening machine, a housing, a rotary work spindle journaled in said housing, power transmission mechanism for rotating said work spindle at a plurality of predetermined different speeds, a cooling device to prevent transmission of heat from said spindle to said change speed transmission, comprising a finned portion provided on the outer work projecting end of said work spindle, a surrounding manifold around said finned portion of said work spindle, a source of coolant fluid, means for connecting said fluid into the manifold surrounding said finned portion of said spindle, and an overflow pipe to permit the escape of the excess coolant fluid delivered to said manifold.

16. In a flame hardening machine, a frame, a dual compartment coolant receptacle formed in said frame, a torch carrier movable on said frame above one of said compartments, a work mounting platform forming a partition between said compartments for fixedly mounting work in said one compartment, headstock means for movably mounting work in said one compartment, means for moving said torch carrier, and means for rendering said movable work mounting member operative for actuating a work piece held therein.

17. In a flame hardening machine, a frame, a dual compartment coolant reservoir provided in said frame, a flame hardening torch carrying member movable on said frame and associated with one of said compartments, a work mounting platform in said reservoir forming a partition between said compartments for fixedly mounting the work piece in said one compartment, a headstock mechanism for rotatively mounting work in said one compartment, means for moving said flame hardening torch carrier, and means for effecting rotation of said headstock mechanism.

18. In a flame hardening machine, a frame, a dual compartment coolant reservoir provided in said frame, headstock means for rotatively mounting a work piece in one of said compartments, a work mounting platform in said reservoir forming a partition between said compartments for fixedly mounting a work piece in said reservoir, a flame hardening torch carriage movable on said frame above said one compartment, and means for simultaneously moving said carrier and operating said rotary headstock means in predetermined relative rates of simultaneous movement.

WILLIAM F. GROENE.